3,142,669
MONOAZO DYES

James F. Feeman, Wyomissing, Pa., assignor to Crompton & Knowles Corporation, Worcester, Mass., a corporation of Massachusetts
No Drawing. Filed Dec. 12, 1960, Ser. No. 75,112
4 Claims. (Cl. 260—199)

This invention relates to a new group of organic compounds which are useful as dyes. The new compounds have the following structure:

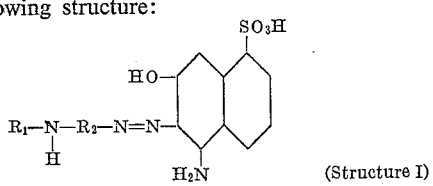
(Structure I)

wherein $R_1$ is a radical selected from the group consisting of aliphatic, alicyclic, aromatic and heterocyclic organic acyl radicals which are devoid of water-solubilizing ionogenic groups, and have molecular weights in the range of from 70 to 190; and triazinyl radicals having the structure:

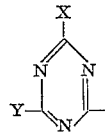

wherein X and Y represent substituents selected from the group consisting of —Cl, —O—lower alkyl, —$NH_2$, —NH—lower alkyl, or —N(lower alkyl)$_2$; and $R_2$ is a radical selected from the group consisting of

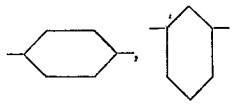

and their lower alkyl and lower alkoxyl substituted derivatives.

The new compounds are obtained by diazotizing and coupling (Reaction I) an appropriate nitoraniline or nitroaniline derivative with gamma acid (2-amino-8-naphthol-6-sulfonic acid) under acid conditions thus:

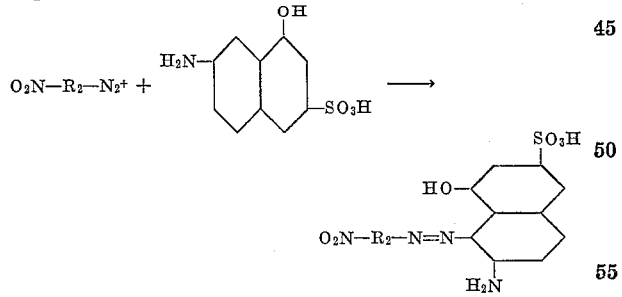

reducing (Reaction II) the nitro group to the corresponding amine:

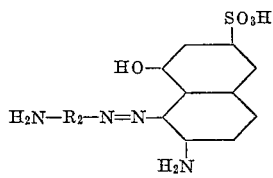

and reacting (Reaction III) the amino group of the thus-formed compound with an acid halide, anhydride, isocyanate, chloroformate, cyanuric chloride, etc. which has an appropriate $R_1$ group to yield the Structure I type compounds.

The compounds prepared in this way have unique and highly valuable properties when used as dyes. They will dye polyurethan fibers and natural and synthetic polyamide fibers such as nylon, silk and wool, in pure lightfast red and scarlet shades; and washfastness can be enhanced by conventional aftertreatments. The dyeing can be from neutral solution and with very high degree of dye exhaustion. Because of the neutral dyeing capability, the compounds of this invention can be used in mixed baths with direct dyes, and mixed fabrics, formed of cellulosic fiber and polyamide or polyurethane fiber, can be dyed in a single bath.

Nitroanilines and nitroaniline derivatives which can be diazotized and coupled with gamma acid to introduce suitable $R_2$ radicals include meta-nitroaniline, para-nitroaniline, 2-amino-4-nitrotoluene, 2-amino-5-nitrotoluene, 2-amino-4-nitroanisole, 2-amino-5-nitroanisole, and the like. The meta compounds are used for producing the scarlet shades and the para compounds are used for producing the reds.

In general, as to the radicals forming the $R_1$ grouping in the Structure I compound, it is preferred to employ any radical which is sufficiently small, from a standpoint of size or bulk, to enable the Structure I compounds to dissolve in substantially neutral aqueous solutions. The $R_1$ and $R_2$ radicals should not include any water solubilizing ionogenic groups such as —$SO_3H$, —COOH, —$SO_2$—$NH_2$, etc. because such groups impart excess solubility which interferes with the desired neutral drying capability.

As $R_1$ radicals, it is preferred to employ the aliphatic, alicyclic, aromatic and heterocyclic organic acyl radicals having molecular weights in the range of from about 70 to 190. Where the molecular weight of the $R_1$ group is greater than about 190, the Structure I compound tends to become too water insoluble to function as a dye. Where the molecular weight of the $R_1$ group is less than about 70, the solubility characteristics become such that the Structure I compound cannot be used for dyeing under substantially neutral pH conditions.

Structure II compounds are those in which acid chlorides are employed in Reaction III to form:

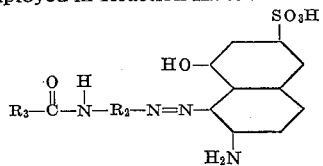

wherein $R_3$ is selected from the group consisting of alkyl, halogenated alkyl, aryl, cycloalkyl, aralkyl, alkoxyalkyl, chlorinated aryl, nitrated aryl, and mononuclear heterocyclic radicals which are devoid of water-solubilizing ionogenic groups, and have molecular weights in the range of from 42 to 162; and $R_2$ is a radical selected from the group consisting of

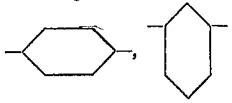

and their lower alkyl and lower alkoxyl substituted derivatives. Typical acid chlorides which are useful in introducing $R_3$ radicals include butyryl chloride, pentanoyl chloride, hexanoyl chloride, heptanoyl chloride, octanoyl chloride, nonanoyl chloride, decanoyl chloride, lauroyl chloride, chloroacetyl chloride, 2-chloro-propionyl chloride, toluyl chloride, anisoyl chloride, cyclohexane carboxylic acid chloride, phenylacetyl chloride, phenoxyacetyl chloride, cinnamoyl chloride, bromobenzoyl chloride, fluorobenzoyl chloride, hydrocinnamoyl chloride, naphthoyl chloride, methoxypropionyl chloride, 2-chloro-benzoyl chloride, 2,4-dichlorobenzoyl chloride, meta-nitrobenzoyl chloride, para-nitrobenzoyl-chloride, furoyl chloride, and the like.

Structure III compounds are those in which chloroformates are employed in Reaction III to form:

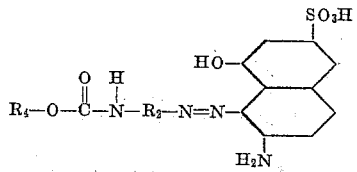

wherein $R_4$ is selected from the group consisting of alkyl, halogenated alkyl, alkoxyalkyl, alkoxyalkoxyalkyl, phenoxyalkyl, cycloalkyl, aralky, aryl of the benzene series, alkoxyaryl of the benzene series, chlorinated aryl of the benzene series, alkyl aryl of the benzene series, heterocyclic, heterocyclic alkyl radicals which are devoid of water-solubilizing ionogenic groups, and have molecular weights in the range from 26 to 146; and $R_2$ is a radical selected from the group consisting of

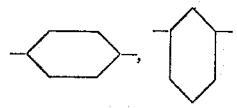

and their lower alkyl and lower alkoxyl substituted derivatives. Typical chloroformates which are useful in introducing $R_4$ radicals include the chloroformic esters of various alcohols, e.g., those of ethyl, isopropyl, butyl, amyl, iso-amyl, valeryl, hexyl, octyl, benzyl, cyclohexyl, phenylethyl, morpholylethyl, furfuryl, tetrahydrofurfuryl, 2-ethoxyethyl, ethoxyethoxyethyl; and the chloroformic esters of various phenols, e.g., those of phenol, the cresols, methoxyphenols, chlorophenols, nitrophenols, and the like.

Structure IV compounds are those in which isocyanates are employed in Reaction III to form:

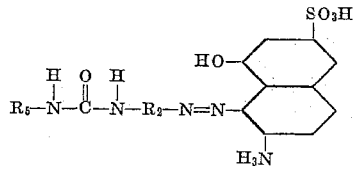

wherein $R_5$ is selected from the group consisting of alkyl, aryl (of the benzene and naphthalene series), cycloalkyl, aralkyl, and heterocyclic radicals which are devoid of water-solubilizing ionogenic groups, and which have molecular weights in the range from 27 to 147; and $R_2$ is a radical selected from the group consisting of

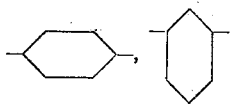

and their lower alkyl and lower alkoxyl substituted derivatives. Typical isocyanates which are useful in introducing $R_5$ radicals include butyl isocyanate, hexylisocyanate, phenyl isocyanate, tolyl isocyanate, naphthyl isocyanate, cyclohexyl isocyanate, benzyl isocyanate, thiazolyl isocyanate, and the like.

Structure V compounds are those in which triazines are employed in Reaction III to form:

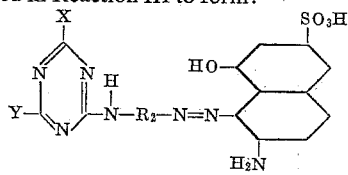

wherein X and Y represent substituents selected from the group consisting of Cl, —O—lower alkyl, —NH$_2$, —NH—lower alkyl and —N(lower alkyl)$_2$; and $R_2$ is a radical selected from the group consisting of

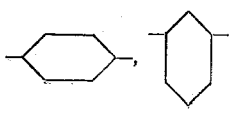

and their lower alkyl and lower alkoxy derivatives. The triazinyl radical can be generated by reacting the aminoazo compounds of Reaction II with cyanuric chloride, cyanuric bromide and the like. If desired, one or more of the halogens can be replaced with ammonia, methylamine, ethylamine, dimethylamine, diethylamine, and the like.

The availability and cost of intermediates and production economics are practical limitations which must be considered in building the new compounds of this invention; and for these reasons compounds having the structure:

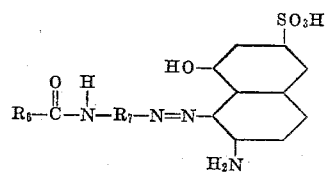

(Structure VI)

wherein $R_6$ represents one of the following radicals: phenyl, lower alkyl (i.e. about 3 to 9 carbons) and lower alkoxy (i.e. about 2 to 8 carbons), and $R_7$ represents one of the following radicals:

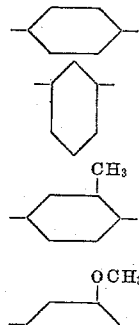

and constitute a presently preferred group of compounds of this invention.

The following examples will serve to illustrate how the compounds of this invention can be prepared and used. In these examples, unless otherwise indicated, parts are by weight, temperatures are given in degrees centigrade, and percentages are percentages by weight.

*Example 1*

A solution was prepared in 1000 parts of water of 35.8 parts of the dye having the structure:

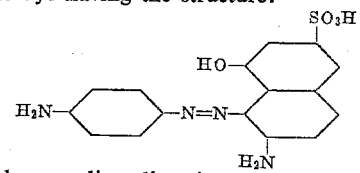

(prepared by coupling diazotized para-nitroaniline with 7-amino-1-naphthol-3-sulfonic acid under acidic conditions, followed by reduction of the nitro group with a suitable reducing agent, such as sodium sulfide, in alkaline solution). Five parts of sodium carbonate was added to the solution at 25°. Then 25 parts of benzoyl chloride was added with vigorous stirring during 30 minutes with simultaneous addition of 100 parts of 10% sodium hydroxide solution at a rate which maintained the pH of the reaction mixture at 9.5 to 10.0. When all of the benzoyl chloride had reacted, the suspension was heated to 60°, filtered, and dried. The product was a red-brown solid having the structure:

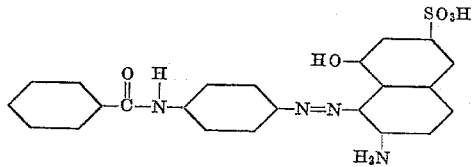

It dyed polyamide fibers, such as nylon, wool and silk, from a substantially neutral bath with excellent exhaustion in clear red shades. The dyeing on nylon exhibited excellent light fastness and good fastness to washing.

*Example 2*

In Example 1, while otherwise proceeding as described, para-nitroaniline was replaced with meta-nitroaniline, resulting in formation of the new compound of the formula:

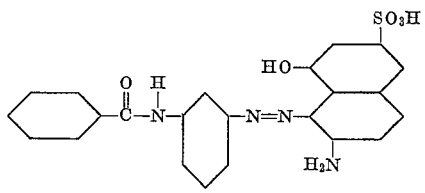

It was a red solid which dyed nylon, wool and silk, as well as other polyamide fibers, from substantially neutral baths, with excellent exhaustion of the color, in bright scarlet shades having very good fastness to light and washing.

*Example 3*

In Example 1, while otherwise proceeding as described, the 25 parts of benzoyl chloride was replaced with 25 parts of butyl chloroformate, resulting in formation of the new compound of the formula:

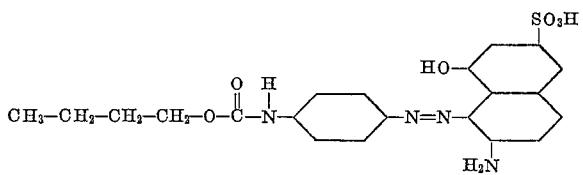

It was a red solid, which dyed polyamide fibers, such as nylon, from substantially neutral baths with excellent exhaustion in bright scarlet-red shades, having very good fastness to light and washing.

*Example 4*

A solution was prepared in 1000 parts of water of 37.2 parts of the dye having the structure:

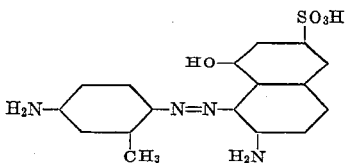

(prepared by coupling diazotized 2-amino-5-nitrotoluene with 7-amino-1-naphthol-3-sulfonic acid under acidic conditions, and subsequently reducing the nitro group with a suitable reagent such as sodium sulfide in alkaline solution). Sodium carbonate (5 parts) was added at 25°. Then 25 parts of benzoyl chloride was added with vigorous stirring during 30 minutes with simultaneous addition of 100 parts of 10% sodium hydroxide solution at a rate which maintained the pH of the reaction mixture at 9.5 to 10.0. When all the benzoyl chloride had reacted, the suspension was heated to 60°, filtered and dried. The product was a red-brown solid having the structure:

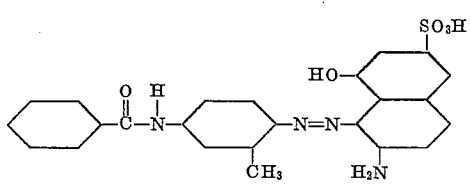

It dyed nylon from a neutral bath in bluish-red shades with excellent exhaustion of the color, and the dyeing exhibited very good fastness to light and washing.

*Example 5*

A solution was prepared in 1000 parts of water of 38.8 parts of the dye having the structure:

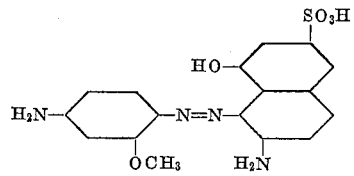

(prepared by coupling diazotized 2-amino-5-nitroanisole with 7-amino-1-naphthol-3-sulfonic acid under acidic conditions, and subsequently reducing the nitro group with a suitable reducing reagent, such as sodium sulfide, in alkaline solution). Sodium carbonate (5 parts) was added at 25°. Then 25 parts of benzoyl chloride was added with vigorous stirring during 30 minutes with simultaneous addition of 100 parts of 10% sodium hydroxide solution at a rate which maintained the pH of the reaction mixture at 9.5 to 10.0. When all the benzoyl chloride had reacted, the suspension was heated to 60°, filtered and dried. The product was a red solid having the structure:

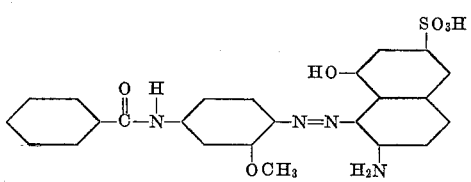

It dyed nylon, wool and silk from a neutral bath with good exhaustion in bluish-red shades. The dyeing on nylon exhibited excellent fastness to light and good washing fastness.

The following table enumerates further neutral acid dyes for polyamide fibers which have the general Structure I. In the table they are characterized by the reactant generating the organic acyl radical, $R_1$, ($R_1$ Precursor), the nitroaniline or derivative thereof which generates the connecting radical, $R_2$, ($R_2$ Precursor), and the shade of the dyeing produced on nylon.

| Example Number | $R_1$ Precursor | $R_2$ Precursor | Shade on Nylon |
|---|---|---|---|
| 6 | Butyryl Chloride | meta-nitroaniline | Scarlet. |
| 7 | Hexanoyl Chloride | do | Do. |
| 8 | Octanoyl Chloride | do | Do. |
| 9 | o-Chlorobenzoyl Chloride | do | Do. |
| 10 | m-Nitrobenzoyl Chloride | do | Do. |
| 11 | Cinnamoyl Chloride | do | Do. |
| 12 | Butyryl Chloride | para nitroaniline | Red. |
| 13 | Hexanoyl Chloride | do | Do. |
| 14 | Octanoyl Chloride | do | Do. |
| 15 | Lauroyl Chloride | do | Do. |
| 16 | o-Chlorobenzoyl Chloride | do | Do. |
| 17 | 2,4-Dichlorobenzoyl Chloride. | do | Do. |
| 18 | m-Nitrobenzoyl Chloride | do | Bluish-red. |
| 19 | p-Nitrobenzoyl Chloride | do | Do. |
| 20 | Cinnamoyl Chloride | do | Do. |
| 21 | Phenylacetyl Chloride | do | Red. |
| 22 | Phenoxyacetyl Chloride | do | Do. |
| 23 | Phenyl Isocyanate | do | Do. |
| 24 | 1-Naphthyl Isocyanate | do | Do. |
| 25 | Furoyl Chloride | do | Do. |
| 26 | Ethyl Chloroformate | do | Red-scarlet. |
| 27 | Isopropyl Chloroformate | do | Do. |
| 28 | Isoamyl Chloroformate | do | Do. |
| 29 | n-Hexyl Chloroformate | do | Do. |
| 30 | 2-Chloropropionyl Chloride | do | Red. |
| 31 | Cyanuric Chloride | do | Do. |
| 32 | (1) Cyanuric Chloride, (2) Ammonia. | do | Do. |
| 33 | Benzoyl Chloride | 2-amino-4-nitrotoluene. | Do. |

Formulas of representative dyes of the tabulated examples are as follows:

Example 8
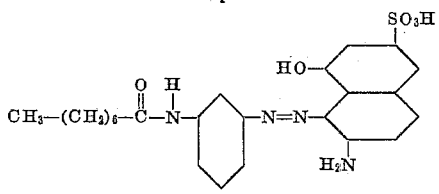
Example 11
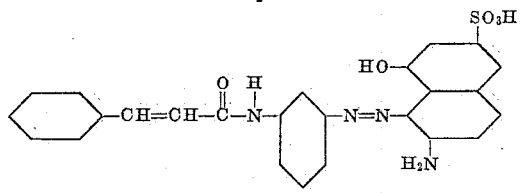
Example 22
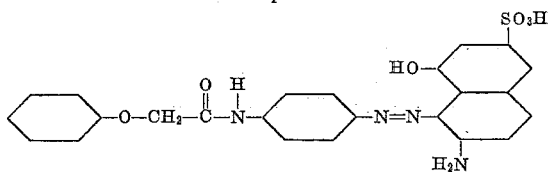
Example 23
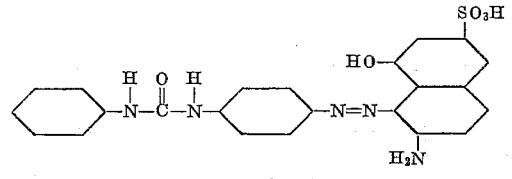
Example 25
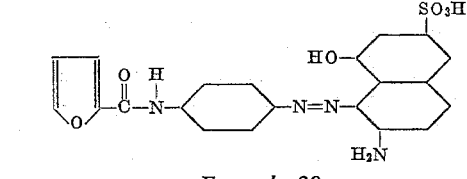
Example 29
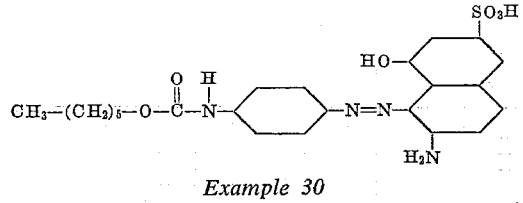
Example 30
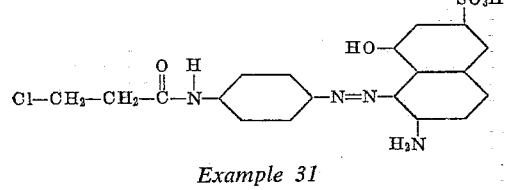
Example 31
Example 32
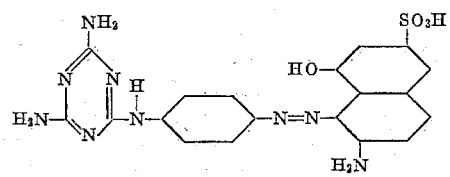
I claim:
1. The compound:
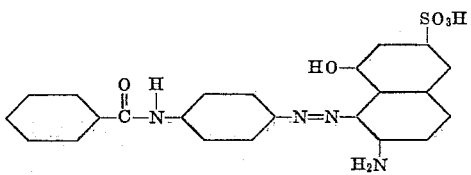
2. The compound:
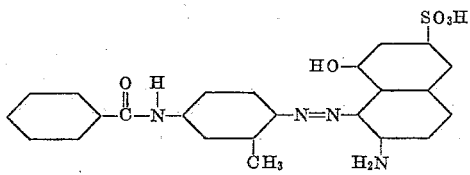
3. The compound:
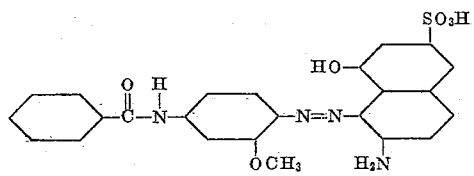
4. The compound:
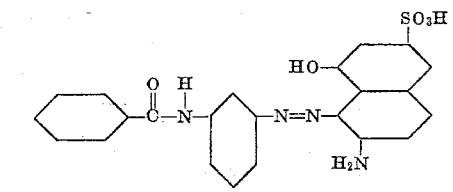
References Cited in the file of this patent
UNITED STATES PATENTS
| | | |
|---|---|---|
| 1,123,430 | Tropp | Jan. 5, 1915 |
| 1,201,544 | Bergdolt | Oct. 17, 1916 |
| 1,359,969 | Montmollin | Nov. 23, 1920 |
| 1,408,405 | Schoner et al. | Feb. 28, 1922 |
| 2,374,157 | Kvalnes | Apr. 17, 1945 |
| 2,374,158 | Knight et al. | Apr. 17, 1945 |
| 2,849,437 | Montmollin et al. | Aug. 26, 1958 |
| 2,891,941 | Fasciati et al. | June 23, 1959 |
FOREIGN PATENTS
| | | |
|---|---|---|
| 291,963 | Germany | May 13, 1916 |
| 520,239 | Germany | Mar. 16, 1931 |
| 609,117 | Germany | Feb. 7, 1935 |
| 1,228,834 | France | Mar. 21, 1960 |

UNITED STATES PATENT OFFICE
CERTIFICATE OF CORRECTION

Patent No. 3,142,669  
July 28, 1964  
James F. Feeman

It is hereby certified that error appears in the above numbered patent requiring correction and that the said Letters Patent should read as corrected below.

Column 1, lines 11 to 18, the formula should appear as shown below instead of as in the patent:

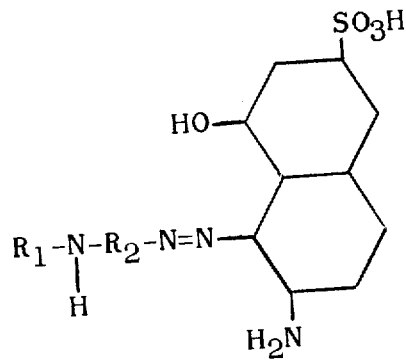

same column, line 42, for "nitoraniline" read -- nitroaniline --; column 3, lines 35 to 41, the formula should appear as shown below instead of as in the patent:

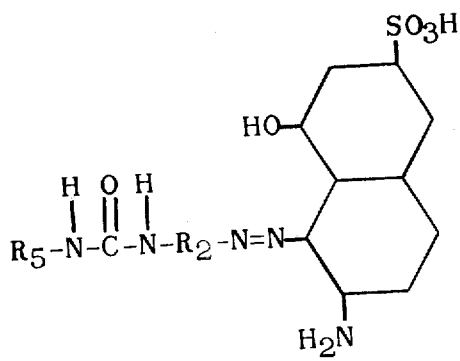

Signed and sealed this 5th day of January 1965.

(SEAL)  
Attest:

ERNEST W. SWIDER  
Attesting Officer

EDWARD J. BRENNER  
Commissioner of Patents